(12) United States Patent
Brown

(10) Patent No.: US 7,966,421 B2
(45) Date of Patent: *Jun. 21, 2011

(54) METHOD AND APPARATUS FOR LOGICALLY EXPANDING THE LENGTH OF A SEARCH KEY

(75) Inventor: David A. Brown, Carp (CA)

(73) Assignee: SAtech Group, A.B. Limited Liability Company, Wilmington, DE (US)

(*) Notice: Subject to any disclaimer, the term of this patent is extended or adjusted under 35 U.S.C. 154(b) by 1437 days.

This patent is subject to a terminal disclaimer.

(21) Appl. No.: 09/886,659

(22) Filed: Jun. 21, 2001

(65) Prior Publication Data

US 2011/0082866 A1 Apr. 7, 2011

Related U.S. Application Data

(60) Provisional application No. 60/212,966, filed on Jun. 21, 2000, provisional application No. 60/258,436, filed on Dec. 27, 2000, provisional application No. 60/294,387, filed on May 30, 2001.

(51) Int. Cl.
*G06F 15/16* (2006.01)
*G06F 7/00* (2006.01)
*G06F 17/30* (2006.01)

(52) U.S. Cl. ......... 709/245; 707/706; 707/770; 707/773

(58) Field of Classification Search ................. 709/242, 709/245; 707/3, 6, 206, 207, 212, 216, 706, 707/770, 773; 711/108, 216; 370/254, 351, 370/389

See application file for complete search history.

(56) References Cited

U.S. PATENT DOCUMENTS

| | | | |
|---|---|---|---|
| 3,716,840 A * | 2/1973 | Masten et al. | 707/3 |
| 4,450,525 A | 5/1984 | Demuth et al. | |
| 4,661,658 A | 4/1987 | Matyas | |
| 5,202,986 A * | 4/1993 | Nickel | 707/3 |
| 5,329,618 A | 7/1994 | Moati | |
| 5,359,724 A | 10/1994 | Earle | |
| 5,384,568 A | 1/1995 | Grinberg et al. | |
| 5,386,413 A | 1/1995 | McAuley | |
| 5,438,535 A * | 8/1995 | Lattibeaudiere | 365/49 |
| 5,459,717 A * | 10/1995 | Mullan et al. | 370/351 |
| 5,479,401 A | 12/1995 | Bitz et al. | 370/60.1 |
| 5,561,786 A | 10/1996 | Morse | |
| 5,680,161 A | 10/1997 | Lehman | |

(Continued)

FOREIGN PATENT DOCUMENTS

EP  0453707 A2  10/1991

(Continued)

OTHER PUBLICATIONS

Degermark Mikael et al., "Small Forwarding Tables for Fast Routing Lookups", Department of Computer Science and Electrical Engineering, Luleå University of Technology, Sweden, *SigComm '97 Cannes*, France pp. 3-14 (1997).

(Continued)

*Primary Examiner* — Kristie D Shingles

(57) ABSTRACT

A lookup table provides a longest prefix match for a search key longer than a lookup table's mapper key. The lookup table performs a multi-level search in one or more mappers for the result value based on a portion of the search key provided as the mapper key. The lookup table is searched in multiple passes with successive portions of the search key until the result value is found.

31 Claims, 8 Drawing Sheets

U.S. PATENT DOCUMENTS

| | | | | |
|---|---|---|---|---|
| 5,727,051 A * | 3/1998 | Holender | | 379/112.05 |
| 5,787,151 A | 7/1998 | Nakatsu et al. | | |
| 5,857,196 A | 1/1999 | Angle et al. | | 707/102 |
| 5,930,805 A * | 7/1999 | Marquis | | 707/201 |
| 5,946,679 A * | 8/1999 | Ahuja et al. | | 707/3 |
| 6,011,795 A * | 1/2000 | Varghese et al. | | 370/392 |
| 6,014,659 A * | 1/2000 | Wilkinson et al. | | 707/3 |
| 6,034,958 A | 3/2000 | Wicklund | | |
| 6,067,574 A * | 5/2000 | Tzeng | | 709/247 |
| 6,085,188 A | 7/2000 | Bachmann | | |
| 6,141,655 A | 10/2000 | Johnson et al. | | |
| 6,161,144 A * | 12/2000 | Michels et al. | | 709/238 |
| 6,189,143 B1 | 2/2001 | Simonyi | | |
| 6,192,051 B1 * | 2/2001 | Lipman et al. | | 370/389 |
| 6,199,100 B1 * | 3/2001 | Filepp et al. | | 709/203 |
| 6,223,172 B1 * | 4/2001 | Hunter et al. | | 707/3 |
| 6,226,710 B1 * | 5/2001 | Melchior | | 711/108 |
| 6,247,014 B1 | 6/2001 | Ladwig et al. | | |
| 6,266,706 B1 * | 7/2001 | Brodnik et al. | | 709/242 |
| 6,285,994 B1 * | 9/2001 | Bui et al. | | 707/2 |
| 6,338,079 B1 | 1/2002 | Kanamori et al. | | |
| 6,385,649 B1 | 5/2002 | Draves et al. | | |
| 6,430,527 B1 * | 8/2002 | Waters et al. | | 703/3 |
| 6,434,144 B1 * | 8/2002 | Romanov | | 370/392 |
| 6,452,908 B1 | 9/2002 | Yamada et al. | | |
| 6,460,112 B1 * | 10/2002 | Srinivasan et al. | | 711/108 |
| 6,490,592 B1 | 12/2002 | St. Denis et al. | | |
| 6,512,766 B2 | 1/2003 | Wilford | | |
| 6,513,028 B1 * | 1/2003 | Lee et al. | | 707/2 |
| 6,522,632 B1 * | 2/2003 | Waters et al. | | 370/254 |
| 6,526,055 B1 | 2/2003 | Perlman et al. | | |
| 6,539,369 B2 | 3/2003 | Brown | | |
| 6,539,455 B1 * | 3/2003 | Khanna et al. | | 711/108 |
| 6,553,002 B1 * | 4/2003 | Bremer et al. | | 370/254 |
| 6,563,823 B1 | 5/2003 | Przygienda et al. | | |
| 6,570,866 B1 | 5/2003 | Murase et al. | | |
| 6,571,313 B1 * | 5/2003 | Filippi et al. | | 711/108 |
| 6,658,482 B1 | 12/2003 | Chen et al. | | |
| 6,675,163 B1 * | 1/2004 | Bass et al. | | 707/6 |
| 6,687,247 B1 | 2/2004 | Wilford et al. | | |
| 6,691,218 B2 * | 2/2004 | Brown | | 711/216 |
| 6,711,153 B1 * | 3/2004 | Hebb et al. | | 370/351 |
| 6,744,775 B1 | 6/2004 | Beshai et al. | | |
| 6,754,799 B2 * | 6/2004 | Frank | | 711/216 |
| 6,778,530 B1 * | 8/2004 | Greene | | 370/389 |
| 6,782,282 B2 | 8/2004 | Bielefeldt | | |
| 6,782,382 B2 * | 8/2004 | Lunteren | | 707/3 |
| 6,826,561 B2 * | 11/2004 | Cao et al. | | 707/3 |
| 6,836,771 B2 * | 12/2004 | Brown | | 707/3 |
| 6,839,825 B1 | 1/2005 | Brown | | |
| 6,873,982 B1 * | 3/2005 | Bates et al. | | 707/5 |
| 6,877,005 B2 * | 4/2005 | Hunter et al. | | 707/10 |
| 6,880,064 B1 | 4/2005 | Brown | | |
| 6,917,954 B2 | 7/2005 | Ahmad et al. | | |
| 6,956,858 B2 | 10/2005 | Hariguchi et al. | | |
| 7,023,807 B2 * | 4/2006 | Michels et al. | | 370/238 |
| 7,106,732 B2 | 9/2006 | Brown | | |
| 7,423,981 B2 | 9/2008 | Brown | | |
| 7,715,385 B2 | 5/2010 | Brown | | |
| 2001/0042130 A1 | 11/2001 | Brown | | |
| 2001/0056417 A1 | 12/2001 | Cao | | |
| 2002/0059197 A1 | 5/2002 | Hunter | | |
| 2002/0080798 A1 | 6/2002 | Hariguchi et al. | | |
| 2005/0175005 A1 * | 8/2005 | Brown | | 370/389 |

FOREIGN PATENT DOCUMENTS

| | | |
|---|---|---|
| JP | 10-257066 | 9/1998 |
| JP | 11-191781 | 7/1999 |
| JP | 2000-151691 A | 5/2000 |
| JP | 2001-517024 | 10/2001 |
| JP | 2005-022297 A | 1/2005 |
| WO | WO 99/13619 | 3/1999 |
| WO | WO 99/14906 | 3/1999 |
| WO | WO 01/10097 A2 | 2/2001 |

OTHER PUBLICATIONS

Gupta, P., et al., "Routing Lookups in Hardware at Memory Access Speeds," INFOCOM '98, IEEE, 8 pages.

Ruiz-Sanchez, M.A., et al., "XP002901792 Survey and Taxonomy of IP Address Lookup Algorithms," IEEE Network, (Mar./Apr. 2001), 16 pages.

Hariguchi, Network Routing Table, Jun. 30, 2000, US Provisional Appl. 60/215,653, pp. 1-52, Figs. 1-23 and Appendixes 1-2, 93 pages.

Office Action in JP Patent Application 2001-542955, mailed May 11, 2010, 5 pages.

Yu, D. et al., "XP-001010965 Forwarding Engine for Fast Routing Lockups and Updates," IEEE, 1999.

Response to May 11, 2010 Office Action in JP Patent Application 2001-542955, dated Aug. 22, 2010, 10 pages.

Hayashi, Tsunemasa, et al., Table Search Engine for Telecommunications, IEICE Technical Report, vol. 98, No. 572, pp. 65-72, 1999, 9 pages.

International Search Report for PCT/CA2000/01442 mailed Jul. 12, 2001, 5 pages.

Written Opinion for PCT/CA2000/01442 mailed Jan. 21, 2002, 2 pages.

Reply to Written Opinion for PCT/CA2000/01442, dated Mar. 14, 2002, 12 pages.

International Preliminary Examination Report for PCT/CA2000/01442 mailed Apr. 16, 2002, 6 pages.

Notice of Allowance for US Appl. No. 09/733,627 mailed Sep. 26, 2003, 6 pages.

Office Action in U.S. Appl. No. 11/099,724 mailed Feb. 3, 2009, 10 pages.

Response to Feb. 3, 2009 Office Action in U.S. Appl. No. 11/099,724, dated Jun. 3, 2009, 12 pages.

Final Rejection in U.S. Appl. No. 11/099,724 mailed Sep. 1, 2009, 10 pages.

Response to Sep. 1, 2009 Final Rejection in U.S. Appl. No. 11/099,724, dated Oct. 21, 2009, 10 pages.

Advisory Action for U.S. Appl. No. 11/099,724 mailed Nov. 3, 2009, 3 pages.

Request for Continued Examination filed for U.S. Appl. No. 11/099,724, dated Feb. 1, 2010, 2 pages.

Office Action in U.S. Appl. No. 11/099,724 mailed Feb. 22, 2010, 8 pages.

Examiner Summary Interview Record, U.S. Appl. No. 11/099,724, mailed Apr. 15, 2010, 3 pages.

Response to Feb. 22, 2010 Office Action in U.S. Appl. No. 11/099,724, dated May 13, 2010, 9 pages.

Notice of Allowance, Examiner's Amendment and Examiner's Interview Summary for U.S. Appl. No. 11/099,724, mailed Jun. 22, 2010, 9 pages.

Request for Continued Examination filed for U.S. Appl. No. 11/099,724, dated Sep. 22, 2010, 12 pages.

U.S. Appl. No. 09/886,648 filed Jun. 21, 2001.

U.S. Appl. No. 11/099,724 filed Apr. 6, 2005.

U.S. Appl. No. 09/733,628 filed Dec. 8, 2000.

International Search Report for PCT/CA2000/01441 mailed Jul. 12, 2001, 5 pages.

Written Opinion for PCT/CA2000/01441, mailed Jan. 21, 2002, 2 pages.

Reply to Written Opinion for PCT/CA2000/01441; dated Mar. 14, 2002, 13 pages.

International Preliminary Examination Report for PCT/CA2000/01441 mailed Apr. 15, 2002, 7 pages.

International Search Report for PCT/CA2000/01444 mailed Jul. 13, 2001, 4 pages.

Written Opinion for PCT/CA2000/01444 mailed Jan. 21, 2002, 2 pages.

Reply to Written Opinion for PCT/CA2000/01444; dated Mar. 21, 2002, 10 pages.

International Preliminary Examination Report for PCT/CA2000/01444 mailed Apr. 23, 2002, 6 pages.

International Search Report for PCT/CA2000/01443 mailed Jul. 12, 2001, 4 pages.

International Preliminary Examination Report for PCT/CA2000/01443 mailed Jan. 21, 2002, 3 pages.
International Search Report for PCT/CA2002/00786 mailed Mar. 13, 2003, 5 pages.
Written Opinion for PCT/CA2002/00786 mailed Oct. 20, 2003, 3 pages.
International Preliminary Examination Report for PCT/CA2002/000786, dated Dec. 30, 2003, 6 pages.
Notice of Allowance for U.S. Appl. No. 09/886,650 mailed Dec. 3, 2004, 6 pages.
Gupta, P., et al., "Routing Lookups in Hardware at Memory Access Speeds," INFOCOM '98, IEEE, Mar./Apr. 1998, 9 pages.
Hayashi, Tsunemasa, et al., Table Search Engine for Telecommunications, IEICE Technical Report, vol. 98, No. 572, pp. 65-72, Jan. 29, 1999, 11 pages.
Yu, D., et al., "XP-001016965 Forwarding Engine for Fast Routing Lookups and Updates," IEEE, Dec. 1999, 10 pages.
U.S. Patent and Trademark Office, Notice of Allowance and Fee(s) Due, Patent U.S. Appl. No. 11/099,724, mailed Nov. 12, 2010, 13 pages.
Decision of Rejection in JP Patent Application 2001-542955, dated Nov. 25, 2010, 4 pages.

* cited by examiner

METHOD AND APPARATUS FOR LOGICALLY EXPANDING THE LENGTH OF A SEARCH KEY

RELATED APPLICATION(S)

This application claims the benefit of U.S. Provisional Application Nos. 60/212,966 filed on Jun. 21, 2000, 60/258,436 filed on Dec. 27, 2000, and 60/294,387 filed on May 30, 2001. The entire teachings of the above applications are incorporated herein by reference.

BACKGROUND OF THE INVENTION

The Internet is a set of networks connected by routers. A router maintains a routing table that indicates for each possible destination network, the next hop to which a received data packet should be forwarded. The next hop may be another router or the final destination.

An Internet Protocol ("IP") data packet received at a port in a router includes an IP destination address. The IP destination address is the final destination of the IP data packet. Currently there are two versions of IP, IP version 4 ("IPv4") and IP version 6 ("IPv6"). IPv4 provides a 32-bit field in an IP header included in the data packet for storing the IP destination address. IPv6 provides a 128-bit field for storing the IP destination address. The router forwards a received data packet connected to a next-loop router or the final destination if the destination is the local network, dependent on the IP destination address stored in the IP header.

A 32-bit IPv4 destination address provides 4 billion possible routes or destinations. An Internet router typically stores a next hop for 50,000 of the 4 billion possible routes or destinations. However, the number of stored routes will increase with the growth of the Internet and the widespread use of IPv6.

Originally, the IP address space was divided into three classes of IP addresses; A, B and C. Each IP address space was divided into a network address and a host address. Class A allowed for 126 networks and 16 million hosts per network. Class B allowed for 16382 networks with 64,000 hosts per network and class C allowed for 2 million networks with 256 hosts per network. However, dividing the IP address space into different classes reduced the number of available IP addresses. Class C only allowed a maximum of 256 hosts per network which is too small for most organizations. Therefore, most organizations were assigned a Class B address, taking up 64,000 host addresses which could not be used by other organizations even if they were not used by the organization to which they were assigned. Hosts in an organization with a Class B IP address all store the same network address in the 16 Most Significant Bits ("MSBs"), for example, 128.32.xx.xx.

Classless InterDomain Routing ("CIDR") was introduced to free up unused IP host addresses. The remaining unused networks are allocated to organization in variable sized blocks. An organization requiring 500 addresses gets 500 continuous addresses. For example, an organization can be assigned 500 available addresses starting at 128.32.xx. The number of routes stored by a router has increased since the introduction of Classless InterDomain Routing. Classless InterDomain Routing requires longest prefix matching to find the corresponding route instead of searching for a matching network address in order to find the corresponding next hop for the IP destination address. For example, a search can no longer stop after the 16 MSBs of a Class B IP address, for example, 128.xx.xx because 128.32.4.xx may be assigned to another organization requiring a different next hop.

One method for searching for a longest prefix match for a search key is through the use of a binary tree search. A binary tree search matches a 32-bit input, bit by bit, down to 32 levels, requiring 32 searches to finding an entry matching a 32-bit search key. Another method for searching for a match is through the use of a Patricia tree. A Patricia tree reduces the number of searches required if there are no entries down a leaf of the binary tree.

Yet another method for efficiently searching for a next hop associated with an IP destination address is described in PCT application Serial Number PCT/SE98/00854 entitled "Method and System for Fast Routing Lookups" by Brodnick et al. filed on May 11, 1998. The method described by Brodnick reduces the number of next hops stored by not storing duplicate routes. By reducing the number of next hops, the memory requirement is reduced so that a route lookup table can be stored in fast cache memory.

Brodnick et al. divides the 32-bit binary tree into 3-levels. Dividing the binary tree into 3-levels reduces the number of searches for an entry matching a 32-bit search key to three. The indexed entry in the first level indicates whether the search can end at the first level with the route taken from the entry, or the search must continue to a subsequent level using a further portion of the IP destination address.

FIG. 1A illustrates a prior art 64K (65536) bit map representing the first level of a binary tree. A 64K bit map 30 represents the leaves or nodes 44 of the binary tree at depth 16, with one bit per node 44. The bit map is divided into bit-masks of length 16. There are $2^{12}=4096$ bit masks in the 64 k bit map. One bit mask is shown in FIG. 1A. A bit in the bit map 30 is set to '1' if there is a subtree or a route index stored in an array of pointers corresponding to the node 44. A bit in the bit map 30 is set to '0' if the node shares a route entry with a previous node 44.

FIG. 1B illustrates prior art lookup table implemented in cache memory. The lookup table includes an array of code words 36, an array of base indexes 34 and a map table 40. A 32-bit IP address 38 is also shown in FIG. 1B. A codeword 46 is stored in the array of code words 36 for each bit mask in the bit map 30 (FIG. 1A). The code word 46 includes a six-bit value 46a and a 10-bit offset 46b. A base index 42 is stored in the array of base indexes 34 for every four code words 46 in the array of code words 36.

The array of code words 36, array of base indexes 34 and map table 40 are used to select a pointer in an array of pointers (not shown). The pointer stores a route index or an index to perform a further search.

A group of pointers in the array of pointers is selected by selecting a code word 46 in the array of code words 36 and a base index 42 in the array of base indexes 34. The code word 46 is selected using the first 12 bits 50 of the IP address 38. The base index 42 is selected using the first 10 bits 48 of the IP address 38. The correct pointer in the group of pointers is selected using the map table 32.

The 10-bit value 46b in the selected code word 36 is an index into the map table 32. The map table 32 maps bit numbers within a bit-mask to 4-bit offsets. The offset specifies the pointer within the selected group of pointers in the array of pointers. The 10-bit value 46b selects the row in the map table 32 and bits 19:16 of the IP address 52 selects the 4-bit offset 54.

Thus, a search for a pointer requires the following cache memory accesses: (1) read a 16 bit code word 46; (2) read a 16-bit base address 42; (3) read a 4 bit offset 54 from the map table 32; (4) read a pointer at a pointer index where the pointer index is the sum of the base address 42, the code word offset 46a and the 4-bit offset 54.

The same memory accesses are required for each level of the binary tree. Thus, a search of three levels for a 32-bit IPv4 address requires 12 memory accesses. As many as forty-eight memory accesses can be required to perform a longest prefix search for a 128-bit IPv6 address.

SUMMARY OF THE INVENTION

U.S. patent application Ser. No. 09/733,627 entitled "Method and Apparatus for Longest Match Address Lookup," filed Dec. 8, 2000 by David A. Brown describes a lookup table for performing multiple level searches with portions of a search key in successive mappers, entries in the mappers outputting route indexes or providing partial indexes to subsequent mappers. The length of the search key is limited by the number of search levels in the lookup table.

In accordance with the invention, a longest prefix match lookup table allows searching with longer search keys including search keys of different lengths such as the 32-bit IPv4 and 128 IPv6 addresses. The lookup table includes a plurality of mappers. The mappers are indexed by portions of a search key and partial indexes, to output a route index for the search key or to output partial indexes to subsequent mappers. The lookup table also includes a partial index feedback loop by which a mapper is indexed in multiple passes with multiple portions of the search key.

The route index corresponding to the search key is stored in a single location in one of the plurality of mappers. The length of the search key is variable. The search key may include a 32-bit IPv4 address or a 128 IPv6 address. If the search key includes a 32-bit IPv4 address, the route index corresponding to the search key is found within a first search of the plurality of mappers. With a 128-bit IPv6 address, the route index may be found within a first search of the mappers or in a subsequent search through the mappers. The partial index may be a subtree index.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 2:
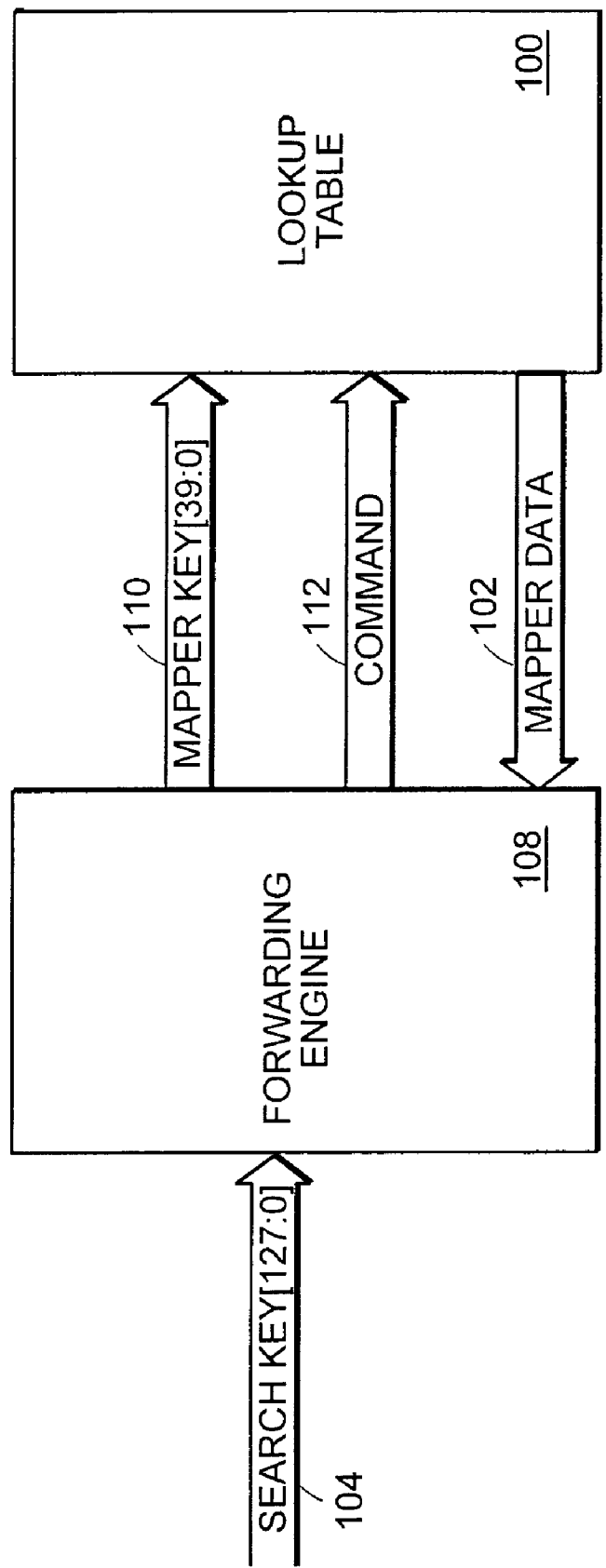
FIG. 2 illustrates a forwarding engine coupled to a longest prefix match lookup table in a router providing a route index for a search key longer than the lookup table's mapper key according to the principles of the present invention.

FIG. 2 illustrates a forwarding engine 108 coupled to a longest prefix match lookup table 100 providing a route index 102 for a search key 104 longer than the lookup table's mapper key 110 according to the principles of the present invention. The lookup table 100 performs a multi-level search for a mapper key 110 forwarded by the forwarding engine 108. In one embodiment, the search key 104 includes an Internet Protocol ("IP") address. The forwarding engine 108 and the lookup table 100 in a router 102 provide a route index corresponding to the IP address. The IP address can be a 32-bit IPv4 address or a 128-bit IPv6 address. For a search key 104 including a 32-bit IPv4 address, a 40-bit mapper key 110 includes an 8-bit prefix and the 32-bit IPv4 address. The lookup table 100 performs a multi-level search for a route index corresponding to the search key 104 forwarded as the 40-bit mapper key 110. A search for a route index corresponding to a 128-bit IPv6 address may require multiple multi-level searches of the lookup table with portions of the search key 104 forwarded as the mapper key 110.

The single lookup table 100 stores route indexes for both IPv4 and IPv6 addresses. A single search of the lookup table for the 32-bit IPv4 address results in a route index 102 corresponding the longest prefix match for the 32-bit IPv4 address stored in the lookup table 100. The resulting route index is forwarded as mapper data 102 to the forwarding engine 108.

A 128-bit IPv6 address is longer than the 40-bit mapper key 110. Thus, multiple searches of the lookup table 100 are required. Typically, there are more route indexes for IPv4 addresses stored in a router than for IPv6 addresses. The length of the mapper key 110 is therefore selected such that a search for a route index corresponding to a 32-bit IPv4 address can be performed in a single search cycle. Thus, only infrequent searches for route indexes corresponding to 128-bit IPv6 addresses require multiple multi-level searches of the lookup table 100.

The multi-level search of the lookup table 100 is described in patent application U.S. patent application Ser. No. 09/733,627 filed on Dec. 8, 2000 entitled "Method and Apparatus for Longest Match Address Lookup," by David A. Brown incorporated herein by reference in its entirety.

The mapper data 102 forwarded to the forwarding engine 108, at the end of each search of the lookup table 100, indicates whether a further search cycle is required. The mapper data 102 includes a route index (a next hop or destination) corresponding to the search key 104 or a partial index for a further search for the route index.

To request a further search in the multi-level lookup table 100, the forwarding engine 108, forwards the next 24-bits of the search key 104 in the Least Significant Bits ("LSBs") of the mapper key 110. The forwarding engine 108 also forwards a "search again internal" command on the command bus 112. The lookup table 100 performs a multi-level search dependent on the result of the previous search and the 24 Least Significant Bits ("LSBs") of the mapper key 110. The forwarding engine 108 continues to forward subsequent 24-bits of the search key 104 until the corresponding route index is returned by the lookup table 100. By providing multiple search capability for a search key 104, the lookup table 100 can store route indexes for search keys 104 longer than the mapper key 110.

In the first search of the lookup table 100, the most significant 40-bits of the search key 104 are forwarded by the forwarding engine 108 to the lookup table 100 with a "search" command forwarded on the command bus 112. Subsequent searches are requested with a "search again internal" command forwarded on the command bus 112. If the command is a "search", the mapper key 110 stores the 40 MSBs of the search key 104. If the command is "search again internal", the mapper key 110 stores the next 24-bits of the search key 104. Typically, most IP addresses received by a router are 32-bit IPv4 addresses for which the lookup table 100 provides the corresponding next hop or destination after a single search of the lookup table 100.

Figure 3A:
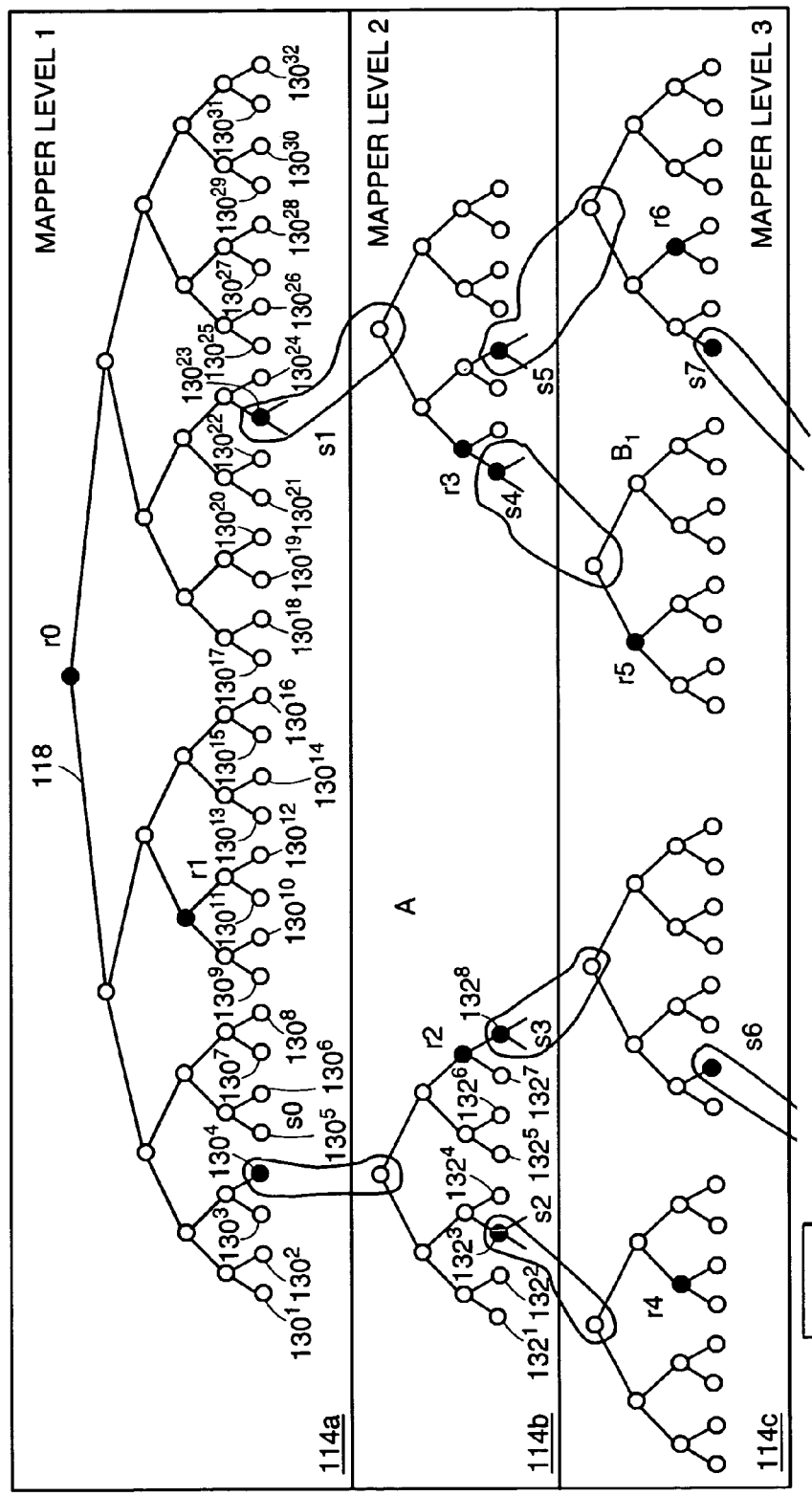
FIG. 3A illustrates a 64-level binary tree representation of entries stored in the lookup table shown in FIG. 2.
Figures 2, 3A:
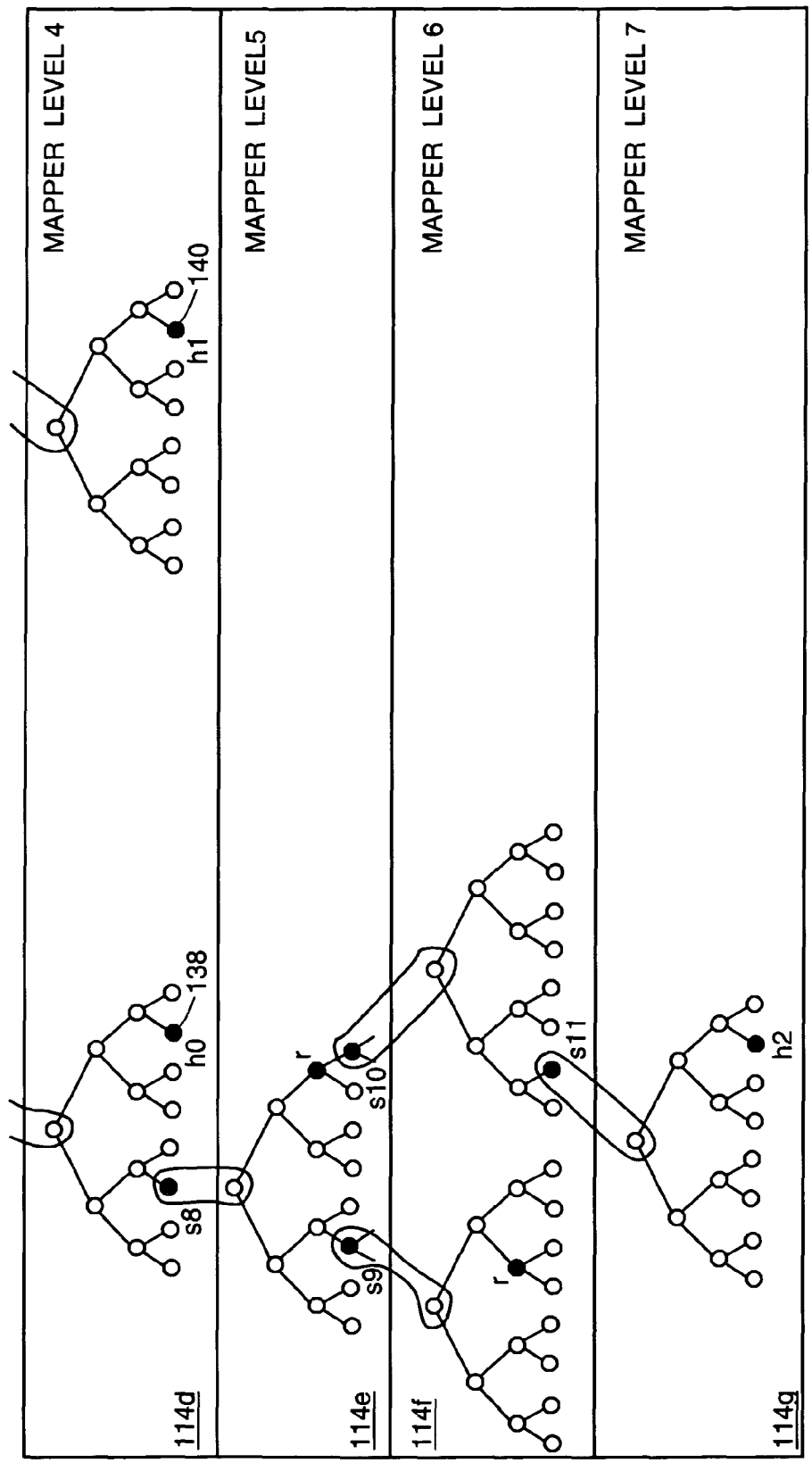

FIG. 3A illustrates a 64-level binary tree representation of the entries stored in the lookup table 100 shown in FIG. 2. The 64-bit binary tree representation is used to illustrate logical expansion of the lookup table 100 for a search key 104 (FIG. 2) that is longer than the mapper key 110 (FIG. 2). In the embodiment shown, the search key 104 is 64-bits long and the mapper key 110 is 40-bits long; however, the invention is not limited to this configuration.

The 64-bit search key 104 (FIG. 2) can be represented as a 64-level binary tree. A search for an entry corresponding to a 64-bit search key 104 (FIG. 2) requires 64 searches to search bit by bit down to 64 levels. To reduce the number of searches, the 64 levels of the binary tree are divided into mapper levels 114a-g. Mapper level_1 114a includes the first 16 of the 64 levels of the binary tree. However, for simplicity only 5 of the 16 levels are shown. Mapper level_2 114b includes the next 8 levels of the 64-level binary tree, with three of the eight levels shown. Mapper level_3 includes the next 8 levels of the 64-level binary tree, with three of the eight levels shown. Each of mapper levels 4-7 also includes 8 levels of the 64-level binary tree with three of the eight levels shown. Each mapper level 114a-g includes a plurality of nodes. Dividing the 64-levels such that 16-levels (16 MSBs of the search key 104 (FIG. 2)) are in mapper level_1 114a and 8-levels in mapper levels 114b-g appears to be optimal in the current memory technology; however, the invention is not limited to this configuration.

Figure 3B:
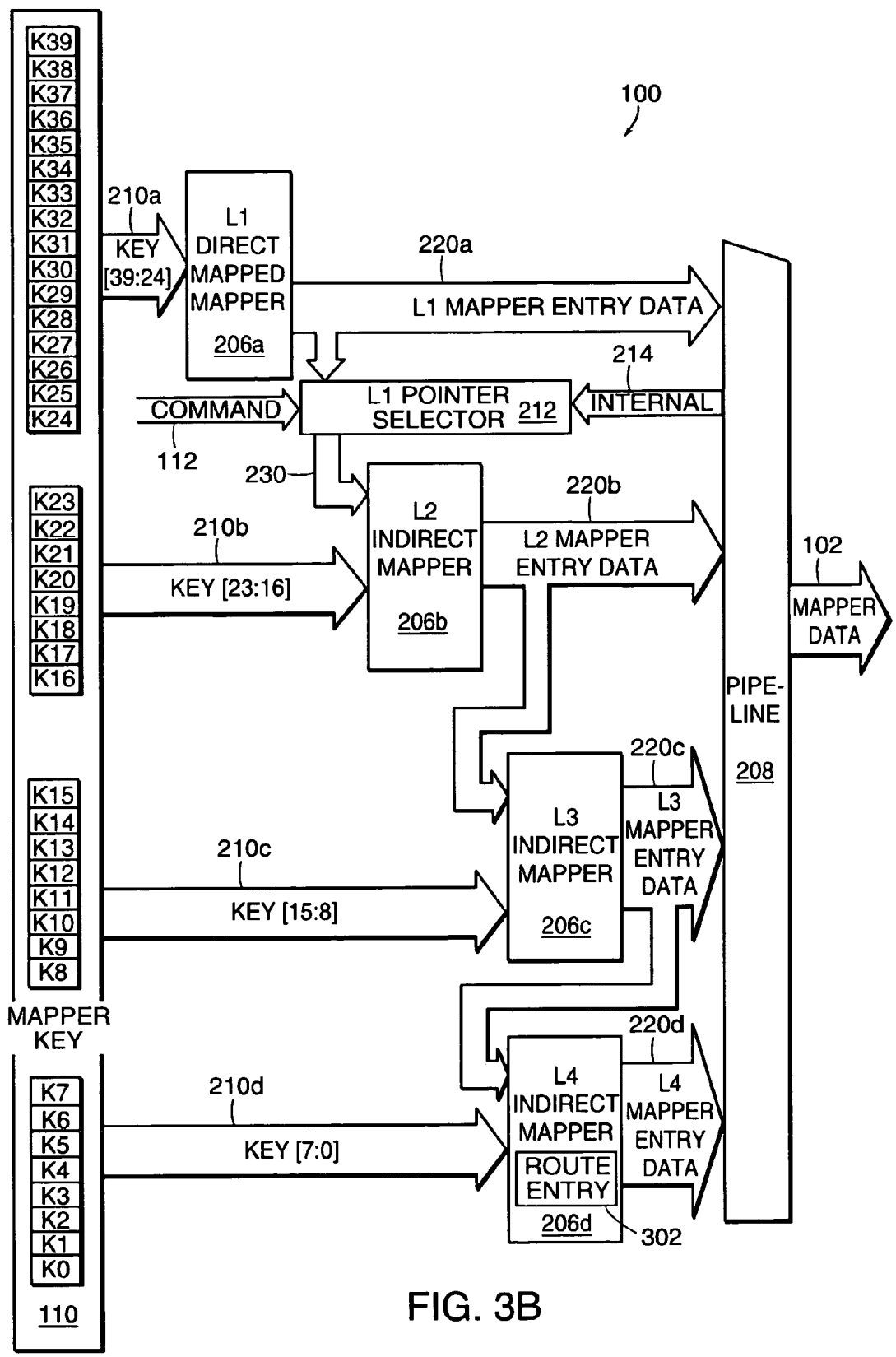
FIG. 3B illustrates a longest match prefix lookup table for a 40-bit mapper key.

FIG. 3B illustrates a longest prefix match lookup table 100 for a 40-bit mapper key 110. The route index corresponding to a search key 104 (FIG. 2) is stored in a route entry 302 in one of the mappers 206a-d. For a 32-bit IPv4 address, the 40-bit mapper key 110 includes an 8-bit prefix and the 32-bit IPv4 address. For a 128-bit IPv6 address the mapper key 110 for the first search request includes an 8-bit prefix and the first 32-bits of the 128-bit IPv6 address. The 8-bit prefix can be a Virtual Private Network ("VPN") identifier associated with the 32-bit IPv4 address or the 128-bit IPv6 address. The lookup table 100 includes four mappers 206a-d. Mapper 206a is a direct mapped mapper. Mappers 206b-d are indirect mappers and will be described later in conjunction with FIG. 5.

L1 mapper 206a is a direct mapped mapper and stores a route index or a subtree index for the L2 mapper 206b. The subtree index is a partial index for a location in the next mapper 206d. The L1 mapper 206a has $2^{16}$ locations, one for each of the $2^{16}$ nodes in the first mapper level 114a (FIG. 3A). The L1 mapper entry data 220a stored at the corresponding location in the L1 mapper 206a is forwarded to a pipeline 208 and to the L1 pointer selector 212. While command is set to "search", the L1 pointer selector 212 forwards the L1 mapper entry data 220a to the L2 mapper 206b. If the L1 mapper entry data 220a indicates that a search of the next level is required using the next eight bits of the search key 210b, a search is performed in the L2 indirect mapper 206b dependent on the next eight bits of the mapper key 210b, and the partial index stored in the L1 mapper entry data 220a forwarded by the L1 pointer selector 212.

The result of the second level search is provided on L2 mapper entry data 220b and forwarded to the pipeline 208 and to the L3 indirect mapper 206c. A third level search is performed in the L3 indirect mapper 206c dependent on the next eight bits of the key 210c and the partial index stored in the L2 mapper entry data 220b.

The result of the search is provided on L3 mapper entry data 220c to the pipeline 208 and to the L4 indirect mapper 206d. The L3 mapper entry data 220c determines if a fourth search is performed in the L4 indirect mapper 206d dependent on the last eight bits of the key 210d and the L3 mapper entry data 220c.

The result of the fourth search is provided on L4 mapper entry data 220d. The route index 102 associated with the longest prefix match for search key 104 is stored in only one location in one of the mappers 206a-d. If the route index is stored in one of the mappers 206a-d, for example, mapper 206b a search of the remaining mappers 206c-d is not necessary and mappers 206c-d are not accessed. The pipeline 208 selects the route index 102 included in one of the mapper entry data 220a-d. For example, the Most Significant Bit ("MSB") of the mapper entry data 220a-d can provide an indication of whether a route index is included.

By using a pipeline 208 in conjunction with the mappers 206a-d, multiple searches of the longest match prefix table 100 with different mapper keys 110 can be performed in parallel. The pipeline 208 allows multiple searches of the lookup table 100 to take place in parallel by storing the mapper entry data 220a-d for each mapper 206a-d associated with the 40-bit mapper key 110 until a search of each of the other mappers 206a-d has been completed, if required, to find route index corresponding to the 40-bit mapper key 110.

Instead of performing 16 separate bit by bit searches for the first 16 bits of the mapper key 110, the route indexes or subtree indexes associated with the first 16-bits of the mapper key 110 are stored in L1 mapper 206a. The L1 mapper 206a is directly indexed with the first 16 MSBs of the mapper key 110. The next mapper 206b is searched dependent on whether the previous mapper 206a stores the route index used to access the next hop information associated with the mapper key 110.

Returning to FIG. 3A, the nodes or leaves shown in mapper level_1 114a include two routes 118, 116 labeled r0 and r1 respectively and two pointers to mapper level_2 114b $130^4$ and $130^{23}$ labeled s0 and s1, respectively. A route index for each route 118, 116 is stored in the L1 mapper 206a (FIG. 3B). Also, a partial index for L2 mapper 206b (FIG. 3B) is stored in the L1 mapper 206a (FIG. 3B) for subtree index $130^4$ and subtree index $130^{23}$. A partial index stored for subtree index $130^4$, in L1 mapper 206a (FIG. 3B) indicates that a search of the next level is required in order to find a route index associated with the mapper key 110.

The value of any node in the tree can be determined by tracing a path from the root 118. Each node in the binary tree is shown with two children, a right child and a left child. The right child is chosen if the parent node is '1.' The left child is chosen if the parent node is '0'. Tracing the path from the root 118 to node 116, r1 is stored as the route index in the L1 mapper 206a (FIG. 3B) for all search keys with MSBs set to '010'. Tracing the path from the root node 118 to s0 node $130^4$, s0 is stored in the L1 mapper 206a (FIG. 3B) for all search keys with MSBs set to '00011'.

The L1 mapper 206a (FIG. 3B) is a direct mapped mapper and stores a route index 102 for each bottom-level node or leaf in the bottom level of mapper level_1 114a. The bottom level of mapper level_1 114a is the sixteenth level of the 64-level binary tree. The sixteenth level has $2^{16}$ nodes. However, for illustrative purposes, the bottom level of mapper level_1 114a is shown as level_5 of the 64-level binary tree. The route indexes stored in the L1 mapper 206a (FIG. 3B) correspond to level_5 $130^1$-$130^{32}$ nodes of mapper level_1114a. Tracing the path from the root node 118 to level_5 nodes $130^1$, $130^2$, $130^3$ the route index is r0. Thus r0 is stored at index 00000, 00001, and 00010 in L1 mapper 206a. Node $130^4$ stores a subtree index s0, thus s0 is stored in the L1 mapper 206a at index 00011. Similarly the route index for level_5 nodes $130^5$-$130^8$ is 1.0 thus locations at indexes 00100, 00101, 00110, and 00111 in the L1 mapper 206a (FIG. 3B) store r0. The route index 102 for level_5 nodes $130^9$-$130^{12}$ is r1, thus locations at indexes 01000, 01001, 01010 and 01011 in the L1 mapper 206a (FIG. 3B) store r1.

Each location in the L1 mapper 206a (FIG. 3B) stores a route index assigned to the level_5 node $130^1$-$130^{32}$ directly or through a parent of the level_5 node $130^{1-32}$ or partial index to the next mapper 206b-c (FIG. 3B). Mapper level_4 114d includes two host nodes h0 at node 138 and h1 at node 140. A search for a host node requires a search of all bits of the mapper key 110. The route index for h0 is stored in L4 mapper 206d (FIG. 3B). Unlike the L1 mapper 206a (FIG. 3B), the L2 mapper 206b (FIG. 3B), L3 mapper 206c (FIG. 3B) and L4 mapper 206d (FIG. 3B) are not directly mapped. Returning to FIG. 3B, seven search levels are required to search for the route index corresponding to host node h2 in mapper level_7. However, the lookup table 100 only includes four mappers 206a-d. Thus, after a first search of nodes in levels 1-4 114a-d in mappers 206a-d, a further search for a route entry or subtree entry for level_5 stored in mapper 206b is performed. L1 pointer selector 212 determines whether the search of mapper 206b is being performed for a node in mapper level_5 or a node in mapper level_2 node dependent on the command forwarded on the command bus 112 (FIG. 2).

If the search of mapper 206b is to continue in mapper level_5, the forwarding engine 108 (FIG. 2) initiates a further search by forwarding the next sequential 24-bits of the 64-bit search key as the mapper key 110 (FIG. 2) and a "search again internal" command on the command bus 112 (FIG. 2). The L1 pointer selector 212 forwards the L1 mapper entry data 220a or the internal mapper data 214 forwarded from the L4 mapper 206d to the L2 indirect mapper 206b. The L2 indirect mapper 206b searches for an entry dependent on the internal mapper data 214 and the next 8-bits of the mapper key 110.

Subtree indexes and route indexes for nodes in level_5 114e (FIG. 3A) are stored in mapper 206b. Subtree indexes and route indexes for nodes in level_6 114f (FIG. 3A) are stored in mapper 206c and subtree indexes and route indexes for nodes in level_? 114g (FIG. 3A) are stored in mapper 206d.

Figure 1A:
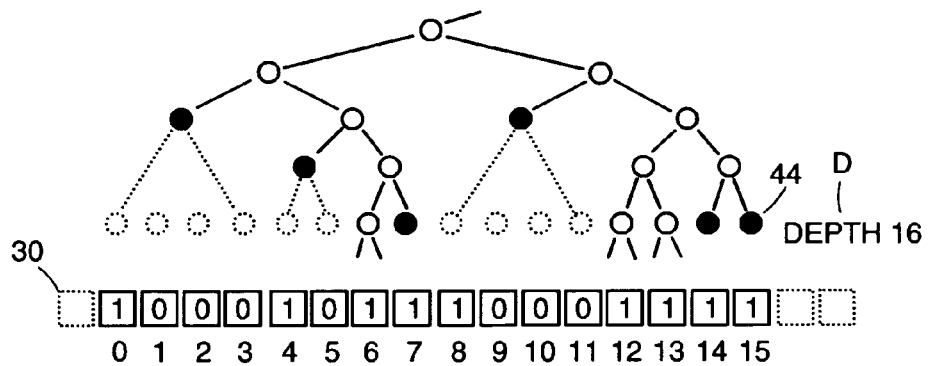
FIG. 1A illustrates a prior art bit map representing the first level of a binary tree.
Figure 1B:
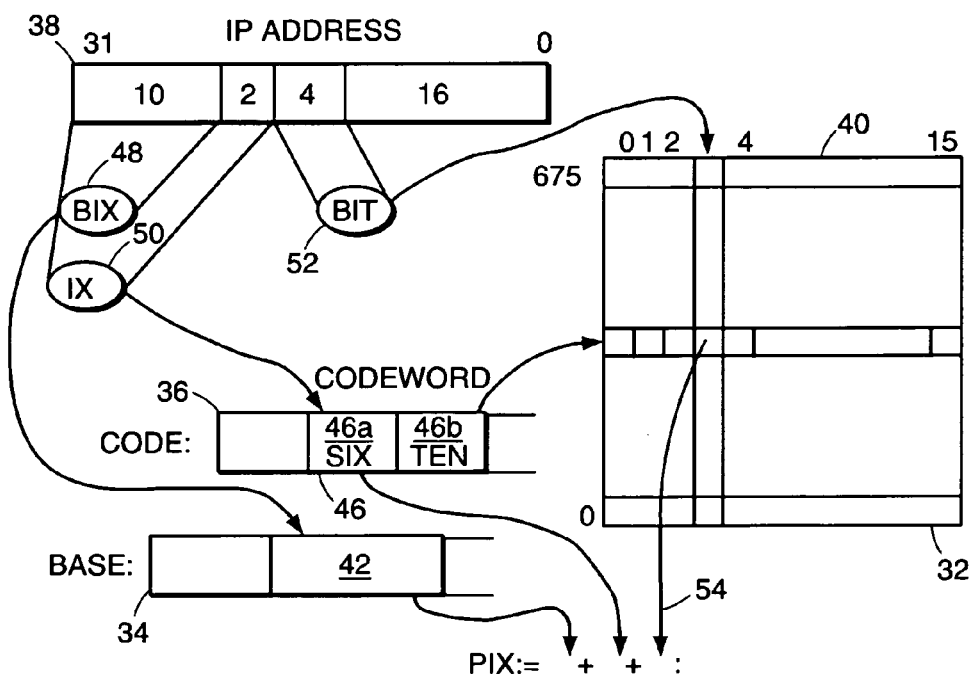
FIG. 1B illustrates a prior art lookup table implemented in cache memory.

Thus, the route index for node labeled h2 in level_7 114g (FIG. 3A) is stored in mapper 206d. The forwarding engine 108 (FIG. 1) issues two search requests to the lookup table 100. The first search request performs four internal multi-level searches. The second search request performs three internal multi-level searches. Thus, lookup table 100 provides the route index 102 corresponding to host node h2 after seven internal multi-level searches.

Figure 4:
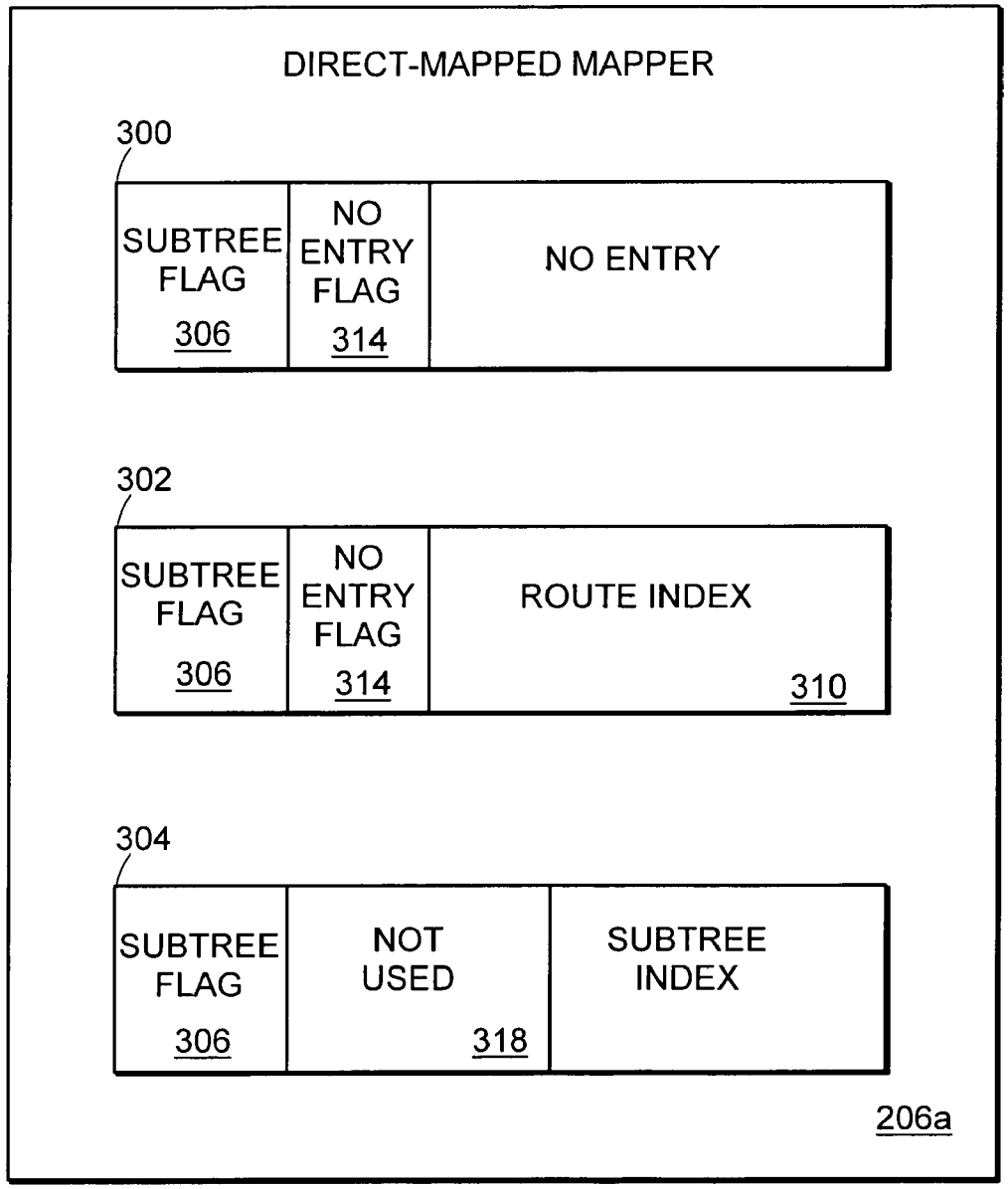
FIG. 4 illustrates the types of mapper entries which can be stored in the direct mapped mapper shown in FIG. 3B.

FIG. 4 illustrates the types of mapper entries which can be stored in the direct mapped mapper 206a shown in FIG. 3B. A mapper entry for any node in the binary tree shown in FIG. 3A can store, a no-entry 300, a route entry 302 or a subtree entry descriptor 304. Each type of mapper entry 300, 302, 304 includes a subtree flag 306. The state of the subtree flag 306 indicates whether the mapper entry is a subtree entry descriptor 304. If the subtree flag 306 is set to '1', the mapper entry is a subtree entry descriptor 304 and includes a L1 mapper entry data 220a (FIG. 3B). The L1 mapper entry data 220a (FIG. 3B) is the address of the subtree entry descriptor 304 stored in the next non-direct mapped mapper 206b-d (FIG. 3B). If the subtree flag 306 is '0', the no-entry flag 314 is checked to determine if the mapper entry is a no-entry 300 or a route entry 302. If the no-entry flag 314 is '0', the entry is a no-entry 300. If the no-entry flag 314 is '1', the entry is a route entry 302 and stores the route index 102 (FIG. 2) associated with the mapper key 110 (FIG. 2) in the route index field 310.

Figure 5:
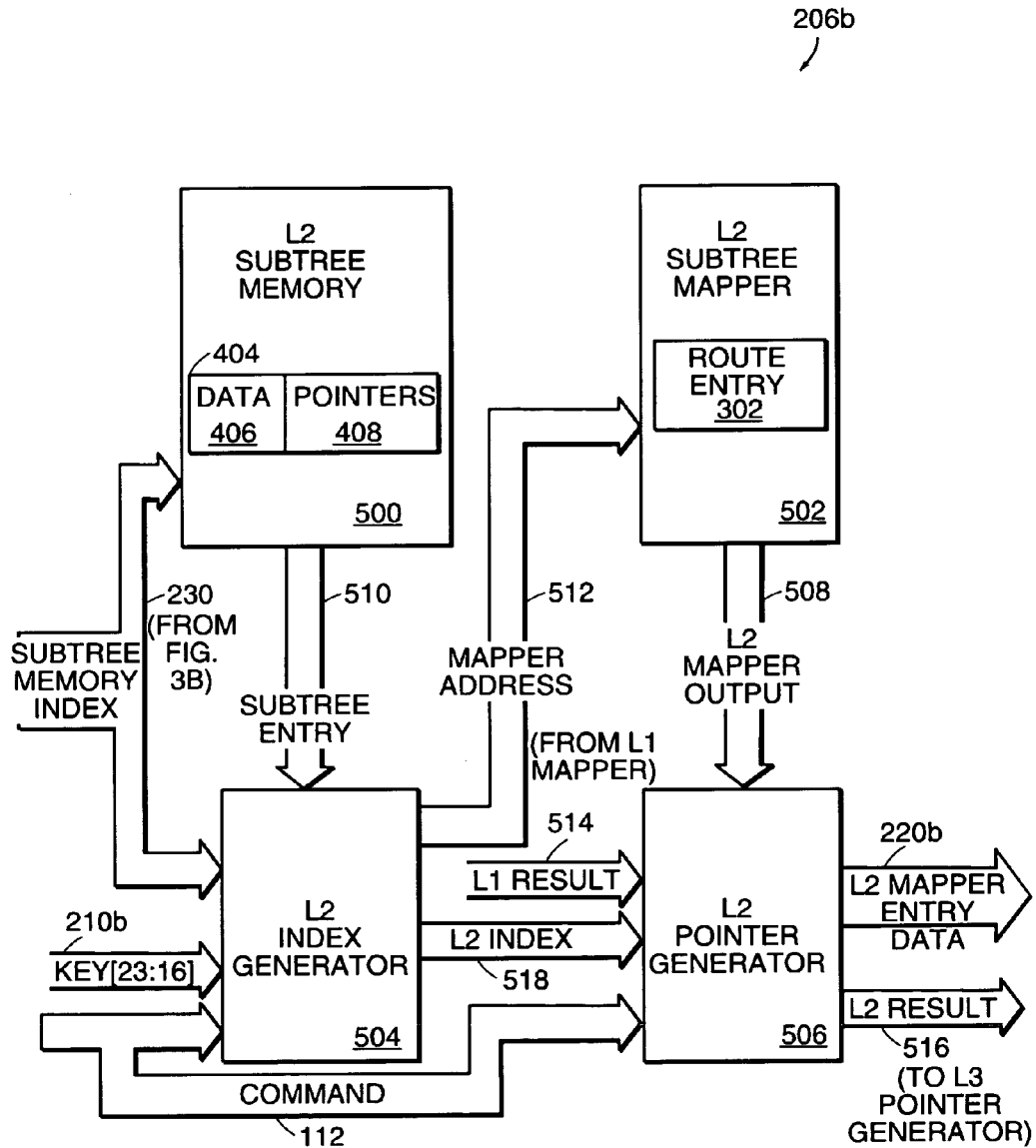
FIG. 5 illustrates one of the indirect mappers shown in FIG. 3B.

FIG. 5 illustrates one of the indirect mappers 206b shown in FIG. 3B. Indirect mapper 206b stores route indexes and subtree indexes corresponding to the nodes in mapper level_2 114b (FIG. 3A) and mapper level_5 114e (FIG. 3A). Mapper 206b includes a subtree memory 500, an index generator 504, a pointer generator 506 and a subtree mapper 502. The L1 mapper entry data 220a selected by the first portion of the mapper key 210a stored in mapper 206a (FIG. 3B) is forwarded to the subtree memory 500 through the L1 pointer selector 212 (FIG. 3B) as a subtree memory index 230 (FIG. 3B). The subtree memory 500 includes a subtree entry 404 indexed by the subtree memory index 230. The subtree entry 404 includes a data field 406 and a pointers field 408.

Returning to FIG. 3A, the subtree entry 404 (FIG. 5) corresponds to the bottom level of one of the subtrees shown in mapper level_2 114b or mapper level_5 114e. If mapper level_2 114b has eight levels, the bottom level of each subtree (not shown) has a maximum of $2^8$ (256) routes, one for each of the $2^8$ (256) nodes.

Continuing with FIG. 5, the subtree entry 404 provides access to 256 possible route indexes 102 (FIG. 1) corresponding to the 256 nodes on the bottom level of the subtree. The route indexes 102 (FIG. 1) are stored in the subtree mapper 502. To provide access to 256 possible route indexes, a dense subtree descriptor is stored in the data field 406. The data field 406 is 256 bits wide, providing one bit for each node at the bottom level of the subtree. A bit in the data field 406 is set to '0' if the route index 102 for the previous node is to be used, and set to '1' to increment to the next mapper entry address, if the next route index stored in the subtree mapper 502 is to be used.

The pointers field 408 is 256 bits wide to allow for the storage of sixteen 16-bit pointers, with each pointer storing the base address for 16 contiguous mapper entries in the subtree mapper 502, to provide access to the 256 route indexes. Thus, the pointers field 408 can indirectly provide a pointer to a mapper entry in the subtree mapper 502 for each node in the bottom level of the subtree. The data field 406 and pointers field 418 are described in U.S. patent application Ser. No. 09/733,627 entitled "Method and Apparatus for Longest Match Address Lookup," filed Dec. 8, 2000 by David A. Brown incorporated herein by reference in its entirety. The subtree mapper 502 is described in co-pending U.S. patent application Ser. No. 09/886,649, filed on even date herewith, entitled "Method and Apparatus for Logically Expanding the Width of Memory" by David A. Brown incorporated herein by reference in its entirety.

The subtree data stored in the dense subtree descriptor in the data field 406 and the subtree pointer stored in the pointers field 408 are forwarded to the index generator 504. The index generator 504 also receives the next eight bits of the mapper key 210b.

The index generator 504 determines the mapper address 512 of the mapper entry associated with the node in the bottom level of the subtree dependent on the next eight bits of the mapper key 210b, and the subtree entry 510 associated with the subtree. The subtree entry 510 includes the subtree data field 406 and subtree pointers field 408 storing subtree data and subtree pointers for the subtree selected by the L1 mapper entry data 220a. The mapper address 512 selects the mapper entry in the subtree mapper 502. The subtree mapper 502 includes the same types of mapper entries as described in conjunction with FIG. 4 for the direct mapped mapper 206a. The contents of L2 mapper entry data 220b determine whether a subsequent search is required. A subsequent search is required, if the mapper entry data 220b includes a subtree entry 304 (FIG. 4), indicating that there is another subtree entry 510 in the next mapper level 114c (FIG. 3A).

The next eight bits of the mapper key 210b selects the node in the bottom level of the selected subtree. The subtree pointers select the base address associated with the node in the subtree and the subtree data selects the offset within the block of mapper entries associated with the base address.

The pointer generator 506 generates the L2 mapper entry data 220b to be forwarded to the L3 indirect mapper 206c (FIG. 3B) dependent on the L2 mapper output 508 from the subtree mapper 502, the L1 result 514 from the L1 direct mapped mapper 206a and the L2 index 518 received from the L2 index generator 504. The pointer generator 506 also generates the L2 result 516 to be forwarded to the L3 pointer generator in the next indirect mapper 206c (FIG. 3B).

The lookup table 100 (FIG. 2) can be included in a lookup table matrix as described in U.S. patent application Ser. No. 09/886,650, filed on even date herewith, entitled "Method and Apparatus for Physical Width Expansion of a Longest Prefix Match Lookup Table", by David A. Brown incorporated herein by reference in its entirety.

Figure 6:
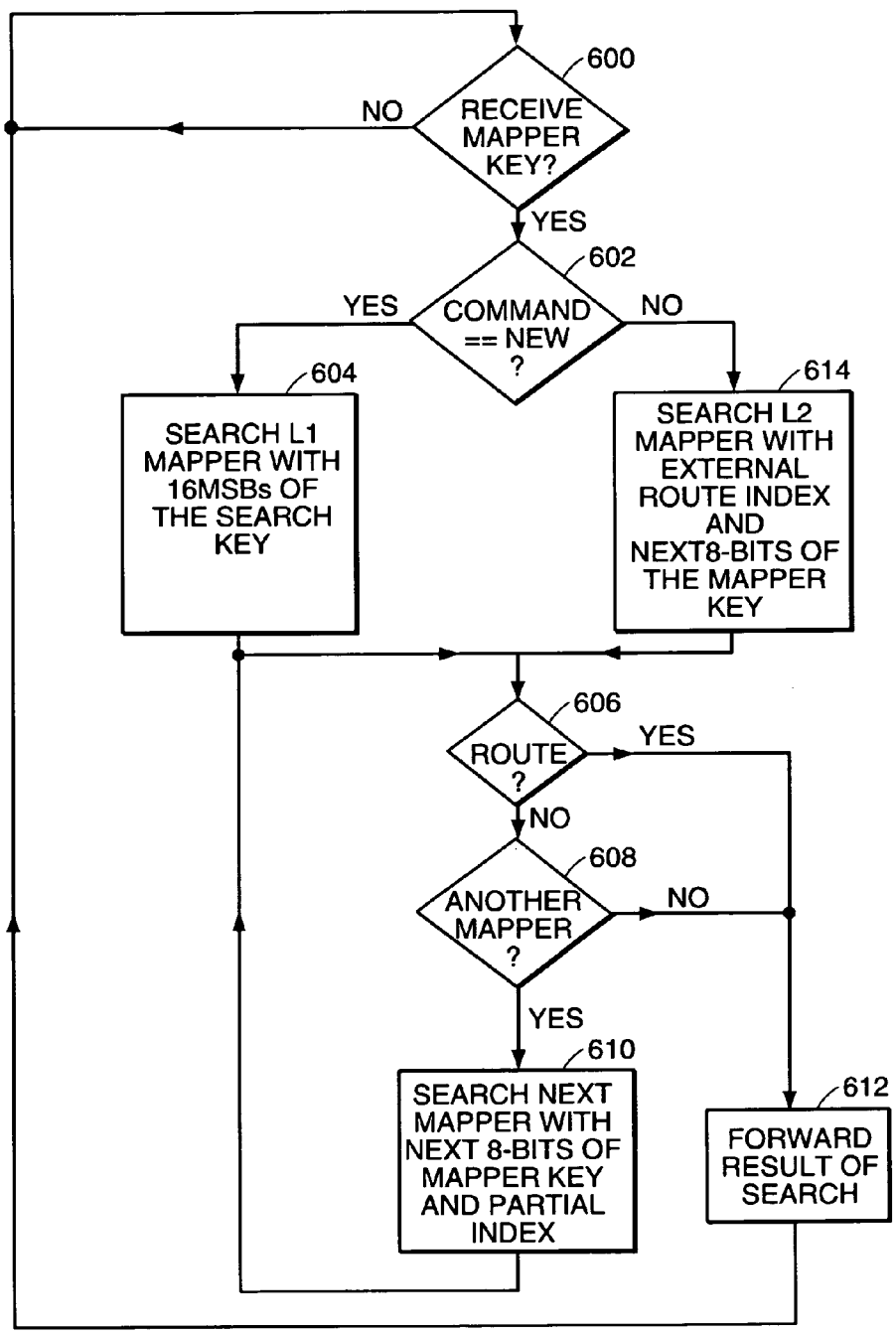
FIG. 6 is a flowchart illustrating the steps for searching for a route index corresponding to a search key in the lookup table shown in FIG. 2.

FIG. 6 is a flowchart illustrating the steps for searching for a route index corresponding to a search key 104 (FIG. 2) longer than a mapper key 110 (FIG. 2) in the lookup table 100 shown in FIG. 3B. FIG. 6 is described in conjunction with FIG. 2 and FIG. 3B.

At step 600, the lookup table 100 (FIG. 2) waits to receive a mapper key 110 (FIG. 2). If a mapper key 110 (FIG. 2) is received, processing continues with step 602.

At step 602, the lookup table 100 (FIG. 2) examines the command forwarded on the command bus 112 (FIG. 1) in conjunction with the mapper key 110 (FIG. 2). If the command is "search", this is the first search for a route index corresponding to the search key and processing continues with step 604. If the command is "search again internal", this is a subsequent search command for the search key 104 (FIG. 2) and processing continues with step 614.

At step 604, the lookup table 100 (FIG. 2) performs a search in the direct mapper 206a (FIG. 3B) for the 16 MSBs of the mapper key 110 (FIG. 2). The 16 MSBs of the mapper key 110 (FIG. 2) are only valid during the first search request. In subsequent searches with command bus 112 set to "search again internal" only the 24 LSBs of the mapper key 110 (FIG. 2) are valid. Processing continues with step 606.

At step 606, the lookup table 100 (FIG. 2) examines the result of the previous search. If the result is a route index corresponding to the search key 104 (FIG. 2), processing continues with step 612. If not, processing continues with step 608.

At step 608, the search of the previous mapper 206a-d (FIG. 3B) in the lookup table 100 (FIG. 3B) did not result in a route index. Instead, the result is a partial index which includes a pointer to a subtree entry 404 stored in another mapper 206b-d (FIG. 3B). The lookup table 100 (FIG. 3B) determines if there is another mapper 206b-d (FIG. 3B) to which the result of the previous search is to be forwarded. If so, processing continues with step 610. If not, processing continues with step 612.

At step 610, the lookup table 100 searches the next mapper 206b-d (FIG. 3B) with the result of the search in the previous mapper 206a-d (FIG. 3B) and the next 8-bits of the mapper key 110. Processing continues with step 606 to check the result of the current search.

At step 612, the result of the multi-level search in the lookup table 100 (FIG. 3B) is forwarded from the lookup table 100 (FIG. 2) to the forwarding engine 108 (FIG. 2) as the mapper data 102 (FIG. 2). The forwarding engine 108 (FIG. 2) examines the result and determines whether another search of the lookup table 100 (FIG. 2) is required. Processing returns to step 600 to wait to receive another mapper key 110 (FIG. 2) from the forwarding engine 108 (FIG. 2).

At step 614, in a subsequent search, the lookup table 100 (FIG. 2) begins a search for the next 24-bits of the search key in the second mapper 206b (FIG. 3B) with the first 8-bits of the next 24-bits and the internal mapper data 214 (FIG. 3B) forwarded from the search of the fourth level in the previous search of the lookup table 100. Processing continues with step 606 to examine the result of the search.

The invention has been described for a 64-bit search key. The lookup table can store route indexes for variable length search keys. For example, a 208-level search for a route index corresponding to a 208-bit search key 104 can be performed in eight searches of the lookup table 100. The first search is performed for a match for the first 40-bits of the search key 104. The next searches are performed based on the result of the previous search of the lookup table 100 and the next sequential 24-bits of the search key 104.

The lookup table can provide route indexes corresponding to a search key that is longer than the lookup table's mapper key by performing multiple searches of the multi-level lookup table. Multiple searches of the lookup table 100 requires more search cycles. However, the same lookup table 100 can provide a route index for a search key that is the same length as the mapper key in a single search cycle, and can also provide a route index for a search key that is longer than the mapper key. Thus, route indexes for search keys of varying lengths can be stored in the same look up table, for example, 32-bit IPv4 addresses and 128-bit IPv6 addresses. The lookup table can provide a route index for an IPv4 address in a single search cycle and a route index for an IPv6 address after one or more search cycles. In a router in which the majority of IP addresses received are 32-bit IPv4 addresses, searches for a route indexes corresponding to a 128-bit IPv6 address are infrequent. Thus, the benefit of having a single lookup table which stores route indexes for both IPv4 and IPv6 addresses compensates for the longer search time for infrequent searches for route indexes corresponding to IPv6 addresses.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
  searching data stored in a computer readable media for a first initial search result using at least a first portion of a first key; and
  if the first initial search result is a route index corresponding to the first key, then returning the route index; and if the first initial search result is a subtree index for an iterative search, then performing an iterative search of the data stored in the computer readable media, the iterative search comprising: searching the data for an iterative search result using a subsequent key comprising the subtree index found in a preceding search and at least a next portion of the first key; and if the iterative search result is a route index corresponding to the first key, then returning the route index; and if the iterative search result is a subtree index for a next search, then performing the iterative search again.

2. The method of claim 1, further comprising:
searching the data for a second initial search result using at least a first portion of a second key, wherein searching the data for the second initial search result is at least partially performed in parallel with searching the data for the iterative search result.

3. The method of claim 2, wherein the first key, the second key, or both the first and second keys comprise at least one of either a 32 bit IPv4 address or a 128 bit IPv6 address.

4. The method of claim 2, wherein the first key, the second key, or both the first and second keys further comprise a prefix corresponding to a Virtual Private Network identifier.

5. The method of claim 1, wherein the data is stored in a lookup table.

6. The method of claim 5, wherein the subtree index comprises a pointer to at least one other entry stored in the lookup table.

7. The method of claim 1, wherein the data is stored in a lookup table comprising a plurality of mappers, the lookup table is configured to return in a single search of the lookup table a route index corresponding to a mapper key, and the iterative search is performed if a length of the first key is greater than a length of the mapper key and the first initial search result is a subtree index for an iterative search.

8. The method of claim 7, wherein the length of the mapper key is 40 bits and the length of the first key is at least 64 bits.

9. The method of claim 1, wherein the data is stored in a lookup table comprising a plurality of mappers including a direct mapper and at least one indirect mapper, searching the data for the first initial search result comprises searching both the direct mapper and said at least one indirect mapper using the first portion of the first key, and performing the iterative search of the data comprises searching again said at least one indirect mapper using the subsequent key without searching again the direct mapper.

10. The method of claim 1, wherein the data is stored in a lookup table comprising a plurality of mappers including a direct mapper and at least one indirect mapper and said at least one indirect mapper is configured to store data corresponding to at least two mapper levels.

11. The method of claim 1, further comprising:
receiving a command indicating that the iterative search should be performed using the subtree index found in the preceding search and the at least next portion of the first key.

12. An apparatus comprising:
a memory storing data;
a forwarding engine configured to search the data for a first initial search result using at least a first portion of a first key, wherein the forwarding engine is configured to return a route index if the first initial search result is a route index corresponding to the first key, and wherein the forwarding engine is configured to perform an iterative search if the first initial search result is a subtree index, wherein the iterative search comprises: searching the data for an iterative search result based on a subsequent key comprising the subtree index found in a preceding search and at least a next portion of the first key; and if the iterative search result is a route index corresponding to the first key, then returning the route index; and if the iterative search result is a subtree index, then performing the iterative search again.

13. The apparatus of claim 12, further comprising:
a controller configured to at least partially search in parallel the data for the iterative search result and a second initial search result using at least a first portion of a second key.

14. The apparatus of claim 13, wherein the first key, the second key, or both the first and second keys comprise at least one of either a 32 bit IPv4 address or a 128 bit IPv6 address.

15. The apparatus of claim 13, wherein the first key, the second key, or both the first and second keys further comprise a prefix corresponding to a Virtual Private Network identifier.

16. The apparatus of claim 13, wherein the data is stored in a lookup table in the memory.

17. The apparatus of claim 16, further comprising a means for storing the data.

18. The apparatus of claim 12, further comprising:
wherein the data is stored in a lookup table in the memory, the lookup table comprises a plurality of mappers including a direct mapper and at least one indirect mapper, said at least one indirect mapper is configured to store data corresponding to at least two mapper levels, and the lookup table includes a pointer selector configured to cause a search of an appropriate mapper level to be performed in said at least one indirect mapper based on a command received from the forwarding engine.

19. The apparatus of claim 12,
wherein the data is stored in a lookup table in the memory, the lookup table comprises a plurality of mappers, the lookup table is configured to return in a single search of the lookup table a route index corresponding to a mapper key, and the iterative search is performed if a length of the first key is greater than a length of the mapper key and the first initial search result is a subtree index for an iterative search.

20. An apparatus comprising:
means for storing data; means for searching the data for a first initial search result using at least a first portion of a first key, wherein said means is configured to return a route index if the first initial search result is a route index corresponding to the first key, and wherein said means is configured to perform an iterative search if the first initial search result is a subtree index, wherein the iterative search comprises: searching the data for an iterative search result based on a subsequent key comprising the subtree index found in a preceding search and at least a next portion of the first key; and if the iterative search result is a route index corresponding to the first key, then returning the route index; and if the iterative search result is a subtree index, then performing the iterative search again.

21. The apparatus of claim 20, further comprising:
means for at least partially searching in parallel the data for the iterative search result and a second initial search result using at least a first portion of a second key.

22. The apparatus of claim 21, wherein the first key, the second key, or both the first and second keys comprise at least one of either a 32 bit IPv4 address or a 128 bit IPv6 address.

23. The apparatus of claim 21, wherein the first key, the second key, or both the first and second keys further comprise a prefix corresponding to a Virtual Private Network identifier.

24. The method of claim 23 wherein the subtree index comprises a pointer to at least one other entry stored in the lookup table.

25. The apparatus of claim 20, wherein the subtree index comprises a pointer to at least one other entry in the means for storing the data.

26. A method comprising:

searching data stored in a computer readable media for an iterative search result using a subtree index found in a preceding search of the computer readable media and at least a next portion of a first key; and if the iterative search result is a route index corresponding to the first key, then returning the route index; and if the iterative search result is a subtree index for a next search, then performing said searching data for an iterative search result again.

27. The method of claim 26, further comprising:

searching the data for a second initial search result using at least a first portion of a second key, wherein searching the data for the second initial search result is at least partially performed in parallel with searching the data for the iterative search result.

28. The method of claim 27, wherein the first key, the second key, or both the first and second keys comprise at least one of either a 32 bit IPv4 address or a 128 bit IPv6 address.

29. The method of claim 27, wherein the first key, the second key, or both the first and second keys further comprise a prefix corresponding to a Virtual Private Network identifier.

30. The method of claim 26, wherein the data is stored in a lookup table.

31. The method of claim 30, wherein the subtree index comprises a pointer to at least one other entry stored in the lookup table.

* * * * *

UNITED STATES PATENT AND TRADEMARK OFFICE
CERTIFICATE OF CORRECTION

| | |
|---|---|
| PATENT NO. | : 7,966,421 B2 |
| APPLICATION NO. | : 09/886659 |
| DATED | : June 21, 2011 |
| INVENTOR(S) | : Brown |

It is certified that error appears in the above-identified patent and that said Letters Patent is hereby corrected as shown below:

Column 12, lines 20-21, in Claim 17, delete "The apparatus of claim 16, further comprising a means for storing the data." and insert -- The apparatus of claim 16, wherein the subtree index comprises a pointer to at least one other entry stored in the lookup table. --.

Column 12, lines 22-23, in Claim 18, delete "further comprising: wherein" and insert -- wherein --.

Column 13, lines 1-3, in Claim 24, delete Claim 24.

Signed and Sealed this
Seventeenth Day of April, 2012

David J. Kappos
*Director of the United States Patent and Trademark Office*